(12) United States Patent
Chen

(10) Patent No.: US 9,345,064 B2
(45) Date of Patent: May 17, 2016

(54) COMMUNICATION DEVICE, COMMUNICATION SYSTEM, AND COMMUNICATION METHOD

(75) Inventor: Hua Jun Chen, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 169 days.

(21) Appl. No.: 14/119,250

(22) PCT Filed: Jul. 6, 2012

(86) PCT No.: PCT/JP2012/067331
§ 371 (c)(1),
(2), (4) Date: Nov. 21, 2013

(87) PCT Pub. No.: WO2013/005832
PCT Pub. Date: Jan. 10, 2013

(65) Prior Publication Data
US 2014/0194156 A1    Jul. 10, 2014

(30) Foreign Application Priority Data

Jul. 7, 2011    (JP) ................... 2011-150997

(51) Int. Cl.
*H04M 1/00*    (2006.01)
*H04W 88/06*    (2009.01)
*H04W 48/18*    (2009.01)

(52) U.S. Cl.
CPC .............. *H04W 88/06* (2013.01); *H04W 48/18* (2013.01)

(58) Field of Classification Search
CPC ................................................. H04W 88/06
See application file for complete search history.

(56) References Cited

U.S. PATENT DOCUMENTS

2008/0069024 A1* 3/2008 Iino .................... H04L 12/4633
370/313
2009/0254666 A1* 10/2009 Agulnik .............. H04L 12/5692
709/228

(Continued)

FOREIGN PATENT DOCUMENTS

JP    2006-520548 A    9/2006
JP    2009-021921 A    1/2009

(Continued)

OTHER PUBLICATIONS

Dye et al., Network Fundamentals CCNA Exploration Companion Guide, Oct. 2010, Chapters 4, 5, 7 and 8.*
International Search Report for PCT/JP2012/067331 dated Sep. 25, 2012.

*Primary Examiner* — Edward Urban
*Assistant Examiner* — Mohammed Rachedine
(74) *Attorney, Agent, or Firm* — Sughrue Mion, PLLC

(57) ABSTRACT

A communication device, in which the OSI reference model physical layer and data-link layer perform wireless communication via at least one of a first wireless network conforming to a first wireless communication standard and a second wireless network conforming to a second wireless communication standard, may include an identification control unit, provided in the data-link layer, that identifies that data, which is received in the physical layer, based on the identification information included in the data, is to be transmitted via either the first wireless network or the second wireless network, the identification control unit controlling so as to transmit, based on the identification result, the data via the first wireless network or the second wireless network.

20 Claims, 9 Drawing Sheets

(56) References Cited

U.S. PATENT DOCUMENTS

2009/0316628 A1* 12/2009 Enns ................. H04L 12/40006
370/328
2010/0316033 A1* 12/2010 Atwal ................. H04W 74/002
370/338
2011/0211468 A1* 9/2011 Zhang ................... H04L 1/0002
370/252

FOREIGN PATENT DOCUMENTS

| WO | 2004/084492 A1 | 9/2004 |
| WO | 2009/155411 A2 | 12/2009 |

* cited by examiner

COMMUNICATION DEVICE, COMMUNICATION SYSTEM, AND COMMUNICATION METHOD

TECHNICAL FIELD

The present invention relates to a communication device, a communication system, and a communication method that communicate by wireless.

Priority is claimed on Japanese Patent Application No. 2011-150997, filed Jul. 7, 2011, the content of which is incorporated herein by reference.

BACKGROUND ART

Conventionally, in order to implement high-level automated operation in a plant or factory or the like, a distributed control system (DCS) has been constituted by using a communication means to connect measuring instruments, actuators and the like, which are on-site devices referred to as field devices, and management devices that perform management and control thereof. Almost all of the communication systems that are the basis of such distributed control systems have communicated by cable, and in recent years ones that perform communication conforming to industrial wireless communication standards such as ISA100 and WirelessHART (registered trademark) and the like have been implemented.

The above-noted ISA100 is an industrial automation wireless communication standard that was established by the ISA (International Society of Automation). In contrast, the above-noted WirelessHART (registered trademark) is a wireless communication standard proposed by the HART (Highway Addressable Remote Transducer) Communication Foundation in the US.

Communication systems implemented in a plant or the like often use a single wireless communication standard. This is because it is basically not possible to communicate between systems using different wireless communication standards. For this reason, in a given plant the communication systems are implemented to conform to ISA100, while in another plant the communication systems are implemented to conform to WirelessHART (registered trademark). Although communication systems of different wireless communication standards are sometimes implemented in one plant, in such cases each of the communication systems exists as a separate system.

In Patent Document 1 and Patent Document 2, although there is no art regarding a communication system performing wireless communication conforming to an industrial wireless communication standard, there is disclosure of are that enables communication between networks using different communication protocols. Specifically, there is disclosure of are that enables connection between a network that uses the IPv4 protocol and a network that uses the IPv6 protocol, by making use of a DSTM (dual stack transition mechanism).

PRIOR ART DOCUMENTS

Patent Documents (Patent Document 1) Published Japanese Translation No. 2006-520548 of the PCT International Publication
(Patent Document 2) Japanese Unexamined Patent Application, First Publication No. 2009-21921

DISCLOSURE OF INVENTION

Problems to be Solved by the Invention

The OST reference model physical layer and data-link layer of the above-described ISA100 and WirelessHART (registered trademark) conform to the IEEE 802.15.4 wireless communication standard, and have many points in common. For example, they perform wireless communication using the same frequency band (2.4 GHz band), and the number and frequency of channels used for wireless communication are the same. However, in spite of having these points of commonality, because a communication system conforming to ISA100 and a communication system conforming to WirelessHART (registered trademark) cannot communicate with one another, they are implemented separate, independent systems.

When a plurality of communication systems are implemented, because devices using each of the systems need to be provided, seen from the standpoint of a user of the communication systems, the initial cost is high, and the burden of cost increases. Also, when implementing a plurality of communication systems, because different tools must be used for maintenance and management for each communication system, not only are convenience and ease of maintenance reduced, but also there is an increase in the cost of maintenance and management. Also, the existence of such a plurality of communication system reduces expandability.

The present invention provides a communication apparatus, a communication system, and a communication method that enable wireless communication between different communication systems, while reducing cost, and improving convenience and ease of maintenance, and enhancing expandability.

Means for Solving the Problems

A communication device, in which the OSI reference model physical layer and data-link layer perform wireless communication via at least one of a first wireless network conforming to a first wireless communication standard and a second wireless network conforming to a second wireless communication standard, may include: an identification control unit, provided in the data-link layer, that identifies that data, which is received in the physical layer, based on the identification information included in the data, is to be transmitted via either the first wireless network or the second wireless network, the identification control unit controlling so as to transmit, based on the identification result, the data via the first wireless network or the second wireless network.

If the data is received via the first wireless network, the identification control unit may append to the data a first identification information to the effect that the data is to be transmitted via the first wireless network. If the data is received via the second wireless network, the identification control unit may append to the data a second identification information to the effect that the data is to be transmitted via the second wireless network.

The communication device may further include: a first path control unit that performs first path control in the first wireless network; and a second path control unit that performs second path control in the second wireless network. If identification is made that the data is to be transmitted via the first wireless network, the identification control unit may pass the data to the first path control unit. If identification is made that the data is to be transmitted via the second wireless network, the identification control unit may pass the data to the second path control unit.

The communication device may further include: a first transfer control unit that performs first transfer control of the data in the first wireless network in accordance with the first path control performed by the first path control unit; and a second transfer control unit that performs second transfer control of the data in the second wireless network in accordance with the second path control performed by the second path control unit.

The first path control unit and the second path control unit may be provided in a network layer of the OSI reference model. The first transfer control unit and the second transfer control unit may be provided in a transport layer of the OSI reference model.

One of the first wireless communication standard and the second wireless communication standard may be ISA100, and the other may be WirelessHART.

The identification information may be a value of frame version included in an MHR (MAC Header) of the data.

A communication system may include a plurality of communication devices wherein the OSI reference model physical layer and data-link layer perform wireless communication via at least one of a first wireless network conforming to a first wireless communication standard and a second wireless network conforming to a second wireless communication standard. At least one of the communication devices may include: an identification control unit, provided in the data-link layer, that identifies that data, which is received in the physical layer, based on the identification information included in the data, is to be transmitted via either the first wireless network or the second wireless network, the identification control unit controlling so as to transmit, based on the identification result, the data via the first wireless network or the second wireless network.

If the data is received via the first wireless network, the identification control unit may append to the data a first identification information to the effect that the data is to be transmitted via the first wireless network. If the data is received via the second wireless network, the identification control unit may append to the data a second identification information to the effect that the data is to be transmitted via the second wireless network.

At least one of the communication devices may further include: a first path control unit that performs first path control in the first wireless network; and a second path control unit that performs second path control in the second wireless network. If identification is made that the data is to be transmitted via the first wireless network, the identification control unit may pass the data to the first path control unit. If identification is made that the data is to be transmitted via the second wireless network, the identification control unit may pass the data to the second path control unit.

At least one of the communication devices may include: a first transfer control unit that performs first transfer control of the data in the first wireless network in accordance with the first path control performed by the first path control unit; and a second transfer control unit that performs second transfer control of the data in the second wireless network in accordance with the second path control performed by the second path control unit.

The first path control unit and the second path control unit may be provided in a network layer of the OSI reference model. The first transfer control unit and the second transfer control unit may be provided in a transport layer of the OSI reference model.

One of the first wireless communication standard and the second wireless communication standard may be ISA100, and the other may be WirelessHART.

The identification information may be a value of frame version included in an MHR (MAC Header) of the data.

A communication method, wherein the OSI reference model physical layer and data-link layer perform wireless communication via at least one of a first wireless network conforming to a first wireless communication standard and a second wireless network conforming to a second wireless communication standard, may include: identifying that data received in the physical layer, based on the identification information included in the data, is to be transmitted via either the first wireless network or the second wireless network; and transmitting, based on the identification result, the data via the first wireless network or the second wireless network.

The communication method may further include: receiving data via at least one of the first wireless network and the second wireless network; appending to the data a first identification information to the effect that the data is to be transmitted via the first wireless network if the data is received via the first wireless network; and appending to the data a second identification information to the effect that the data is to be transmitted via the second wireless network if the data is received via the second wireless network.

One of the first wireless communication standard and the second wireless communication standard may be ISA100, and the other may be WirelessHART.

The identification information may be a value of frame version included in an MHR (MAC Header) of the data.

A method for identifying data in a communication device wherein the OSI reference model physical layer and data-link layer perform wireless communication via at least one of a first wireless network conforming to a first wireless communication standard and a second wireless network conforming to a second wireless communication standard may include: identifying a value of frame version included in an MHR (MAC Header) of data received in the physical layer; transmitting the data via the first wireless network, as a result of the identification, if the value of the frame version is a first value; and transmitting the data via the second wireless network, as a result of the identification, if the value of the frame version is a second value.

One of the first wireless communication standard and the second wireless communication standard may be ISA100, and the other may be WirelessHART.

Effects of the Invention

According to the present invention, an identification control unit provided in the data-link layer identifies the data received in the physical layer and, based on the identification result, passes data to either one of a first path control unit that performs path control in a first wireless network and a second path control unit that performs path control in a second wireless network. For this reason, wireless communication is possible between different communication systems, cost is reduced, convenience and ease of maintenance are improved, and expandability is enhanced.

EMBODIMENTS FOR CARRYING OUT THE INVENTION

A communication device, a communication system, and a communication method in accordance with preferred embodiments of the present invention will be described below, with references made to the drawings. The following descriptions of the preferred embodiments of the present invention are merely specific descriptions of the inventions set forth in the attached claims and equivalents thereof, and are not intended as restrictions, as will be clear to a person skilled in the art based on the present disclosure.

First Preferred Embodiment

Figure 1:
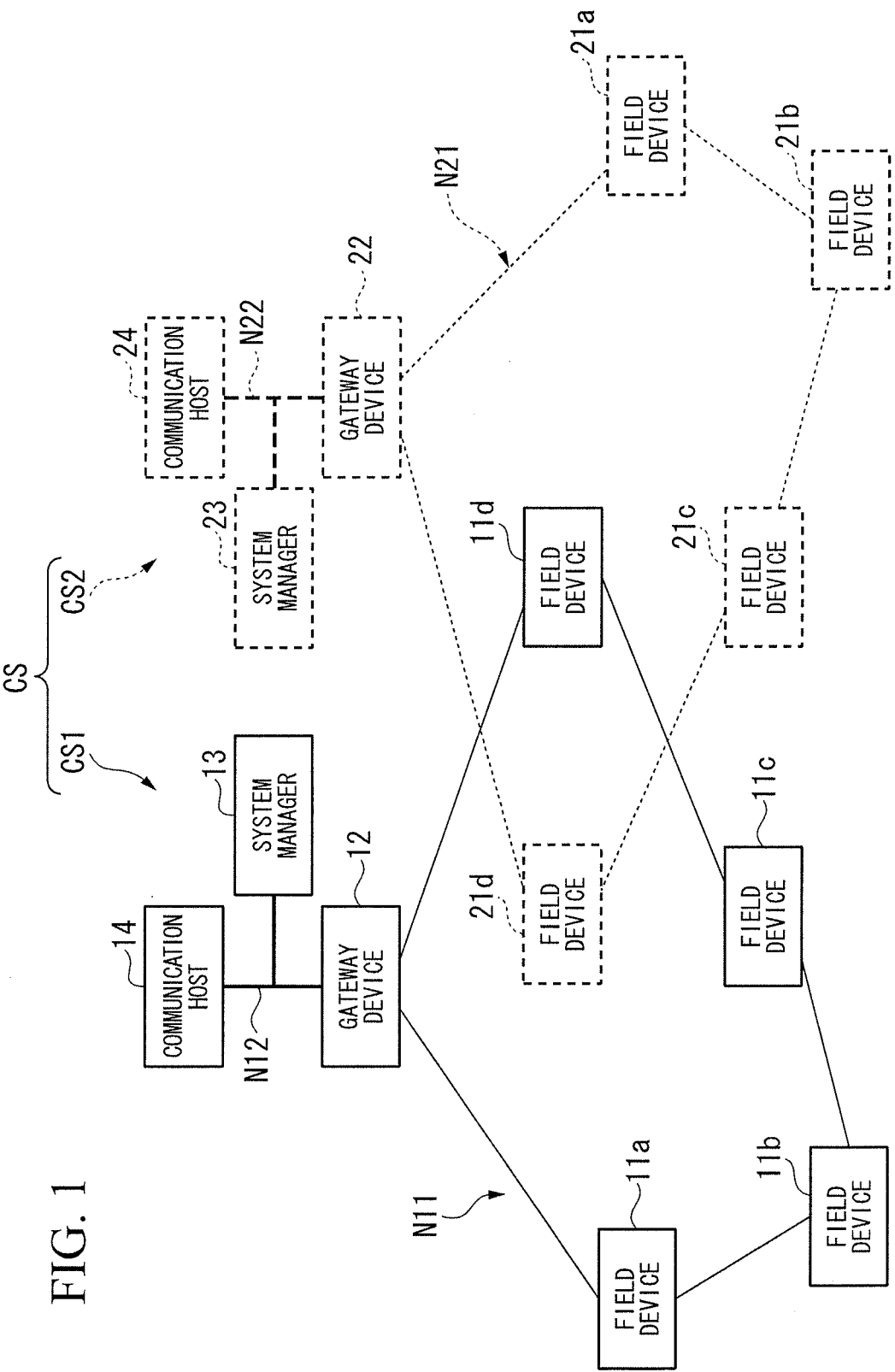
FIG. 1 is a diagram illustrating an overall configuration of a communication system in accordance with a first preferred embodiment of the present invention.

FIG. 1 is an overall configuration drawing of a communication system in accordance with the first preferred embodiment of the present invention. As shown in FIG. 1, the communication system CS in accordance with the first preferred embodiment of the present invention has two communication systems CS1 and CS2, which conform to different wireless communication standards. In the first preferred embodiment of the present invention the communication system CS1 is a communication system that performs wireless communication conforming to WirelessHART (registered trademark) (first wireless communication standard), and the communication system CS2 is a communication system that performs wireless communication conforming to ISA100 (second wireless communication standard). Also, as an aid to understanding in FIG. 1, the communication system CS1 is shown by solid lines, and the communication system CS2 is shown by broken lines.

The communication system CS1 has field devices 11a to 11d, a gateway device 12, a system manager 13, and a communication host 14. The communication system CS1 can communicate via the wireless network N11 (first wireless network) and the wireless network N12. The communication system CS2 has the same type of constitution as the communication system CS1, it having field devices 21a to 21d, a gateway device 22, a system manager 23, and a communication host 24. The communication system CS2 can communicate via the wireless network N21 (second wireless network) and the wireless network N22. Although the example shown in FIG. 1 is one in which the communication system CS1 has four field devices 11a to 11d and the communication system CS2 has four field devices 21a to 21d, the number of field devices in communication systems CS1 and CS2 is arbitrary.

The field devices 11a to 11d are, for example, devices installed in a plant or factory, such as sensor devices such as flow gauges and temperature sensors, valve devices such as flow control valves and open/close valves, actuator devices such as fans and motors, these performing wireless communication conforming to WirelessHART (registered trademark). In this case, of the field devices 11a to 11d, field devices 11c and 11d are devices capable of performing wireless communication conforming not only to WirelessHART (registered trademark) but also conforming to ISA100 (these being referred to below as dual-stack devices).

The operation of the field devices 11a to 11d is basically controlled, for example, by control data that is transmitted from the system manager 13 and the communication host 14, via the gateway device 12. The measurement data obtained by the field devices 11a to 11d is, for example, collected by the communication host 14, via the gateway device 12. Detailed description of the field devices 11c and 11d will be described later.

The gateway device 12 connects the wireless network N11 and the wireless network N12, and is an device that, for example, performs relaying of various data transmitted and received between the field devices 11a to 11d and the system manager 13 and the like. The gateway device 12 also functions as a wireless access point, and performs wireless communication conforming to WirelessHART (registered trademark).

The system manager 13 manages the wireless network N11 and the wireless network N12. For example, the system manager 13, by transmitting control signals to the field devices 11a to 11d (and also to the field devices 21c and 21d) and the gateway device 12, establishes a wireless path between the field devices 11a to 11d (and also the field devices 21c and 21d) and the gateway device 12. In addition, the system manager 13 performs such processing as entry processing regarding whether or not a new field device is to be allowed to enter the wireless network N11. Because the system manager 13 performs management of the wireless network N11 and the like, it is also referred to as a network manager.

The communication host 14 performs communication between the field devices 11a to 11d (and field devices 21c and 21d), via the gateway device 12. Specifically, the communication host 14 performs control (for example, control of opening/closing of a valve) of the field devices 11a to 11d (and field devices 21c and 21d) that are connected to the wireless network N11, and collection of measurement data measured by the field devices 11a to 11d (and field devices 21c and 21d) that are connected to the wireless network N11.

The field devices 21a to 21d, the gateway device 22, the system manager 23, and the communication host 24 provided in the communication system CS2 each have functions that are similar, respectively, to those of the field devices 11a to 11d, the gateway device 12, the system manager 13, and the communication host 14 provided in the communication system CS1. However, of the field devices 21a to 21d, the field devices 21c and 21d are dual-stack devices that are capable of performing wireless communication conforming not only to ISA100 but also conforming to WirelessHART (registered trademark).

The system manager 23 performs processing such as establishment of a wireless path between the field devices 21a to 21d (and also the field devices 11c and 11d) and the gateway device 22. The communication host 24 performs control of the field devices 21a to 21d (and field devices 11c and 11d) that are connected to the wireless network N21, and collection of measurement data measured by the field devices 21a to 21d (and field devices 11c and 11d) that are connected to the wireless network N21.

In this manner, in the first preferred embodiment of the present invention, the field devices 11c and 11d that can be connected to the wireless network N11 can be connected to the wireless network N21 as well, and the field devices 21c and 21d that can be connected to the wireless network N21 can be connected to the wireless network N11 as well. The provision of such field devices 11a, 11d, 21c, and 21d is done to enable wireless communication between different communication systems CS1 and CS2, to reduce the communication system CS cost, and to improve convenient, ease of maintenance, and enhance expandability.

Figure 2:
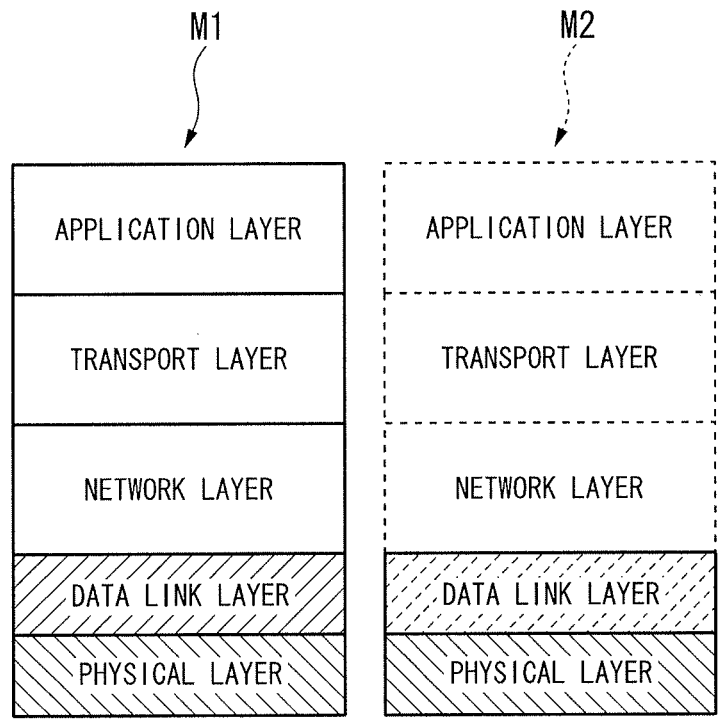
FIG. 2 is a diagram illustrating an OSI reference models of wireless communication standards used in the communication system in accordance with the first preferred embodiment of the present invention.

At this point, a comparison will be made between WirelessHART (registered trademark), which is the wireless communication standard to which the wireless communication system CS1 conforms, and ISA100, which is the wireless communication standard to which the communication system CS2 conforms. FIG. 2 shows the OSI reference models of wireless communication standards used in the communication system in accordance with the first preferred embodiment of the present invention. As shown in FIG. 2, the OSI reference model M1 of WirelessHART (registered trademark), which is the wireless communication standard to which the communication system CS1 conforms and the OSI reference model M2 of ISA100, which is the wireless communication standard to which the communication system CS2 conforms, are made up of a physical layer, a data-link layer, a network layer, a transport layer, and an application layer.

The physical layers and the data-link layers of OSI reference models M1 and M2 have the following points of commonality.

(1) Physical Layers
  Conform to IEEE 802.15.4.
  Use the 2.4-GHz frequency band.
  Use 16 channels, each channel having the same frequency.
(2) Data-Link Layers
  Use EUI64 addresses.
  Support channel-hopping.
  Use TDMA (time-division multiple access) as the media access scheme.

As noted above, the physical layer and the data-link layers in the OSI reference models of WirelessHART (registered trademark) and ISA100 conform to the IEEE 802.15.4 wireless communication standard, and have many points of commonality. For this reason, the physical layer frame format and the data-link layer frame format have the following points of commonality in each of the communication systems CS1 and CS2.

Figure 3:
FIG. 3 is a diagram illustrating a part of a physical layer frame format in the communication systems in accordance with the first preferred embodiment of the present invention.

FIG. 3 shows a part of the physical layer frame format in the communication systems in accordance with the first preferred embodiment of the present invention. The physical layer frame format in the communication systems CS1 and CS2 is constituted by a PPDU (Physical Layer Protocol Data Unit). The PPDU, as shown in FIG. 3, has points of commonality between the communication systems CS1 and CS2, in that it has a five-octet SHR (Synchronization Header) one-octet PHR (Physical Layer Header), and a PSDU (Physical Layer Service Data Unit).

Figure 4:
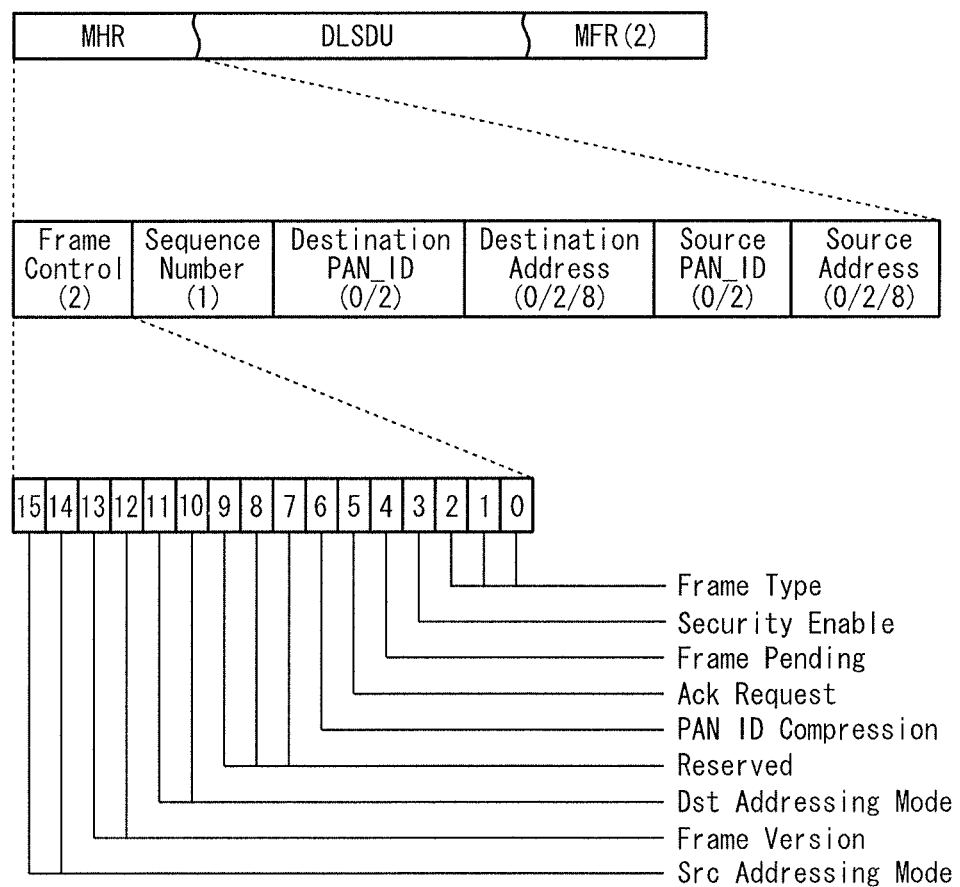
FIG. 4 is a diagram illustrating a part of a data-link layer frame format in the communication systems in accordance with the first preferred embodiment of the present invention.

FIG. 4 shows a part of the data-link layer frame format in the communication systems in accordance with the first preferred embodiment of the present invention. The data-link layer frame format in the communication systems CS1 and CS2 is constituted by a DLPDU (Data-Link Layer Protocol Data Unit). The DLPDU, as shown in FIG. 4, has points of commonality between the communication systems CS1 and CS2, in that it has an MHR (MAC Header), a DLSDU (Data-Link Layer Service Data Unit) and a two-octet MFR (MAC Footer Frame Check Sequence).

In this case, as shown in FIG. 4, the MHR included in the DLPDU includes a two-octet frame control (Frame Control), and the 12th and 13th bits of the frame control (Frame Control) are allocated for the frame version (Frame Version). The Frame Version value is 0b00 in the case of WirelessHART (registered trademark) and 0b01 in the case of ISA100. The values of the frame version are established by the WirelessHART (registered trademark) and the ISA100 standards. The first preferred embodiment of the present invention, focusing on the difference in the value of the frame version, performs processing that is appropriate to the setting value of the frame version or sets an appropriate value of frame version, thereby enabling data (packet) communication between the communication systems CS1 and CS2. Values that have the symbol 0b appended thereto are values (two-digit values) in binary notation.

Figure 5:
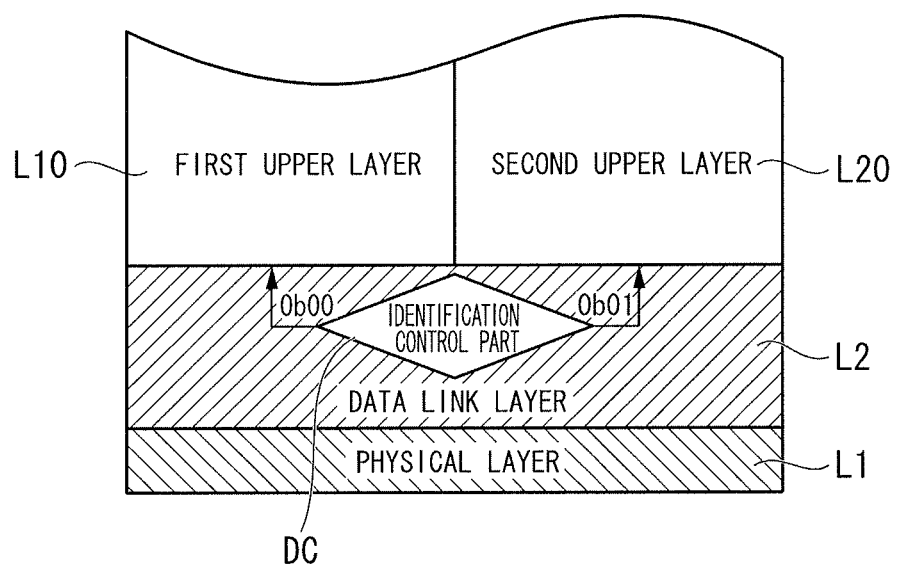
FIG. 5 is a diagram illustrating a basic constitution of field devices as communication devices in accordance with the first preferred embodiment of the present invention.

Next, the field devices 11c, 11d, 21c, and 21d provided as dual-stack devices in the communication systems CS1 and CS2 will be described in detail. FIG. 5 descriptively shows the basic constitution of the field devices as communication devices in accordance with the first preferred embodiment of the present invention. As shown in FIG. 5, the field devices 11c, 11d, 21c, and 21d have a physical layer L1, a data-link layer L2, a first upper layer L10 and a second upper layer L20.

The physical layer L1, as described using FIG. 2, has a constitution for implementing the function of a physical layer that is common to the physical layer of the OSI reference model M1 of WirelessHART (registered trademark), which is the wireless communication standard to which the communication system CS1 conforms, and the physical layer of the OSI reference model M2 of ISA100, which is the wireless communication standard to which the communication system CS2 conforms. The data-link layer L2 has a constitution for implement the function of a data-link layer that is common to the data-link layer of the same OST reference models M1 and M2.

In this case, an identification control unit DC (identification control unit) is provided in the data-link layer L2. This identification control unit DC identifies the frame version (refer to FIG. 4) included in the data received by the physical layer L1 and, based on the identification result, performs control so as to pass the received data to either the first upper layer L10 or the second upper layer L20. Specifically, if the value of the frame version is 0b00, received data is passed to the first upper layer L10, and if the value of the frame version is 0b01, received data is passed to the second upper layer L20. That is, the identification control unit DC passes data received via the wireless network N11 to the first upper layer L10 and passes data received via the wireless network N21 to the second upper layer L20. A feature of the present invention is that the received data is identified by the identification control unit DC provided in the data-link layer L2 and, based on the identification result, is passed to either the first upper layer L10 or the second upper layer L20.

If data is passed from the first upper layer L10, the identification control unit DC sets the frame version value of the data to 0b00 (first identification information), and if data is passed from the second upper layer L20, the identification unit DC sets the frame version value of the data to 0b01 (second identification information). That is, the identification control unit DC appends information to the effect that data from the first upper layer L10 is to be sent via the wireless network N11, and appends information to the effect that data from the second upper layer L20 is to be sent via the wireless network N21.

The first upper layer L10 is constituted so as to implement the function of a layer positioned above the data-link layer in the OSI reference model M1 (refer to FIG. 2) of WirelessHART (registered trademark), which is the wireless communication standard to which the communication system CS1 conforms. The second upper layer L20 is constituted so as to implement the function of a layer positioned above the data-link layer in the OSI reference model M2 (refer to FIG. 2) of ISA100, which is the wireless communication standard to which the communication system CS2 conforms. In this manner, the field devices 11c, 11d, 21c, and 21d have a dual-stack constitution that has a function that enables communication via the wireless network N11 (physical layer L1, data-link layer L2, and the first upper layer L10) and a function that enables communication via the wireless network N21 (physical layer L1, data-link layer L2, and the second upper layer L20).

Figure 6A:
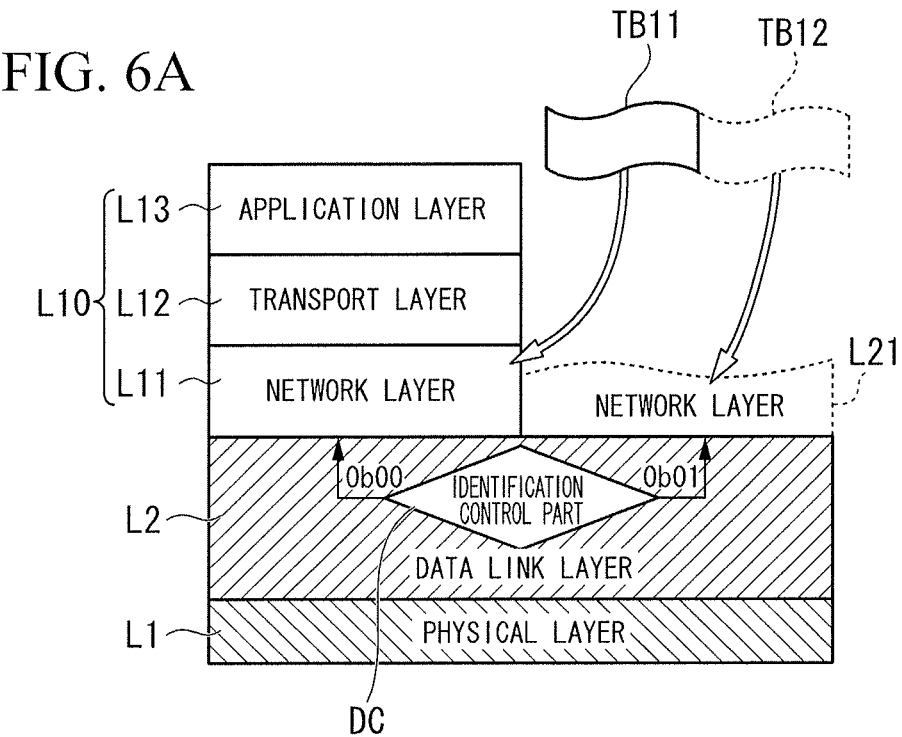
FIG. 6A is a diagram illustrating a main part of a constitution of a field device as a communication device in accordance with the first preferred embodiment of the present invention.
Figure 6B:
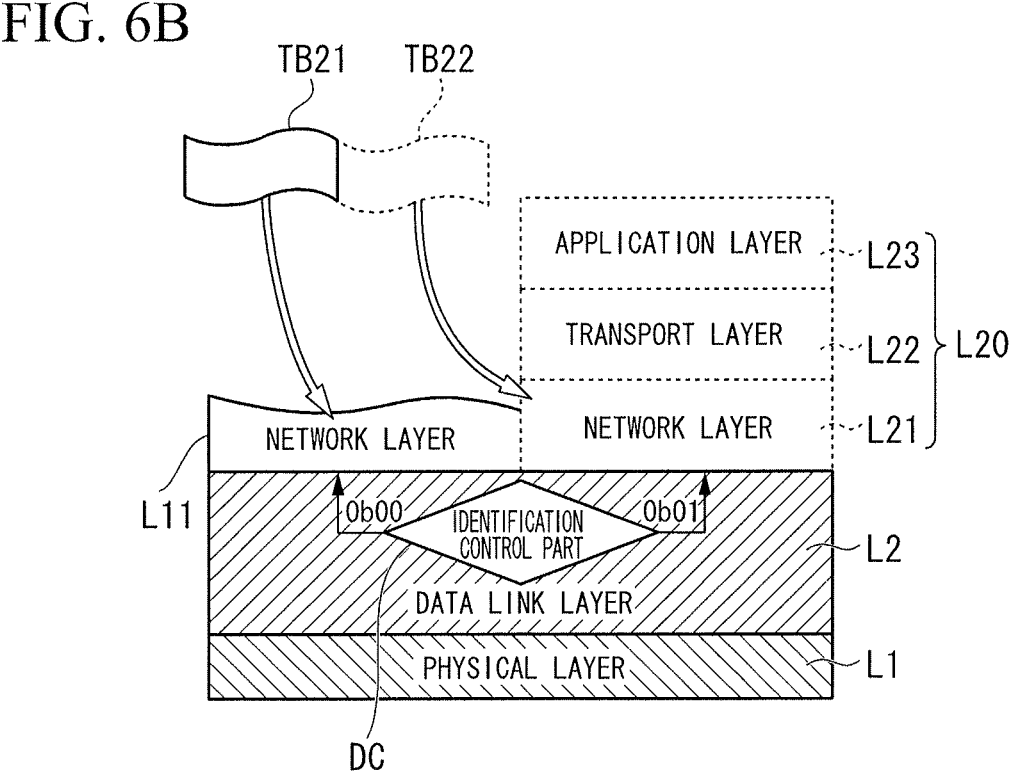
FIG. 6B is a diagram illustrating a main part of a constitution of a field device as a communication device in accordance with the first preferred embodiment of the present invention.

FIG. 6A and FIG. 6B describe the main part of the constitution of a field device as a communication device in accordance with the first preferred embodiment of the present invention. FIG. 6A is a drawing of the main parts of the field devices 11c and 11d. FIG. 6B is a drawing of the main parts of the field devices 21c and 21d. A shown in FIG. 6A, the field devices 11c and 11d have the physical layer L1 and L2, a network layer L11 (first path control unit) a transport layer L12, and an application layer L13 as the first upper layer L10, and a network layer L21 (second path control unit) as the second upper layer L20 shown in FIG. 5.

In this manner, the field devices 11c and 11d have, in addition to the network layer L11 that implements the function of path control in the wireless network N11, the network layer L21 that implements the function of path control in the wireless network N21. For this reason, the field devices 11c and 11d can acquire configuration information of the wireless networks N11 and N21 from the system manager 13 in the communication system CS1, the system manager 23 in the communication system CS2, and the adjacent field devices and create each of the routing tables TB11 and TB12, and can relay and transfer data (packets) in accordance with the routing tables TB11 and TB12.

As shown in FIG. 6B, the field devices 21c and 21d have the physical layer L1, the data-link layer L2, a network layer L11 (first path control unit) as the first upper layer L10, and a network layer L21 (second path control unit), a transport layer L22, and an application layer L23 as the second upper layer L20 shown in FIG. 5. In this manner, the field devices 21c and 21d have, in addition to the network layer L21 that implements the function of performing path control in the wireless network N21, a network layer L11 that implements a function of performing path control in the wireless network N11.

For this reason, the field devices 21c and 21d can acquire configuration information of the wireless networks N11 and N21 from the system manager 13 in the communication system CS1, the system manager 23 in the communication system CS2, and the adjacent field devices and creates each of the routing tables TB21 and TB22, and can relay and transfer data (packets) in accordance with the routing table TB21 and TB22.

Figure 7:
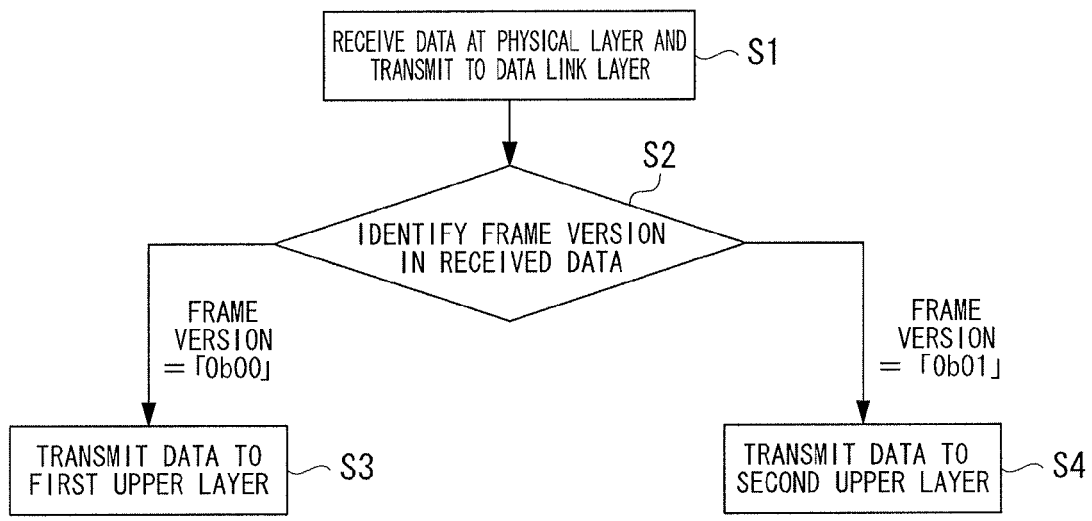
FIG. 7 is a flowchart illustrating a communication method in field devices as communication devices in accordance with the first preferred embodiment of the present invention.
Figure 8:
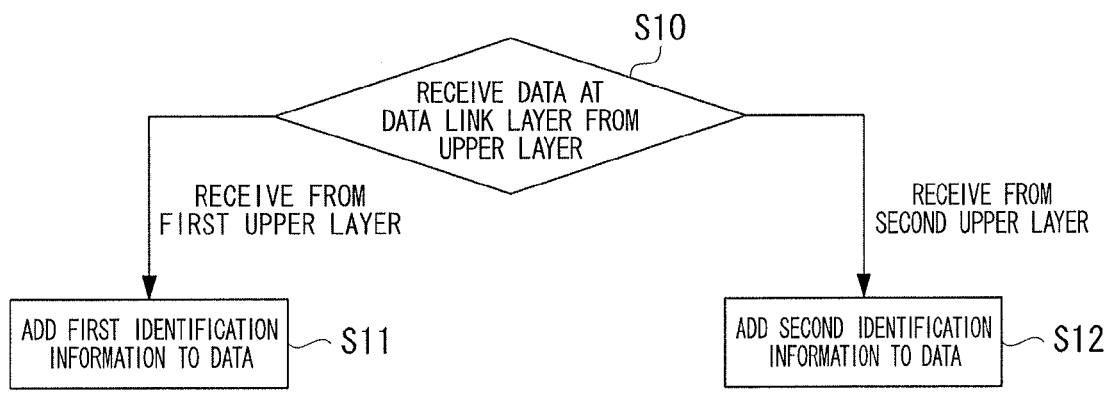
FIG. 8 is a flowchart illustrating a communication method in field devices as communication devices in accordance with the first preferred embodiment of the present invention.

FIG. 7 and FIG. 8 are flowcharts that show a communication method in field devices as communication devices in accordance with the first preferred embodiment of the present invention. In the above-noted constitution, first let us consider the case in which data output from the gateway device 12 is directed toward the field device 11d. At step S1 in FIG. 7, the data output from the gateway device 12 is transmitted to the field device 11d, via the wireless network N11, is received by the physical layer L1 (refer to FIG. 6A) of the field device 11d, and is passed to the data-link layer L2. Upon being passed to the data-link layer L2, at step S2 in FIG. 7, the frame version (refer to FIG. 4) included in the data is identified by the identification control unit DC. At step S3 in FIG. 7, because the frame version value of the data output from the gateway device 12 is set to 0b00, the data from the physical layer L1 is passed by the identification control unit DC to the network layer L11 that forms the first upper layer L10 and, for example, transfer processing or the like is performed by path control of the network layer L11.

Next, let us consider the case of data from the gateway device 22 directed toward the field device 11d. In this case, at step S1, data output from the gateway device 22 is transmitted to the field device 11d via the wireless network N21, and received by the physical layer L1 of the field device 11d. The data received at the physical layer L1, similar to the case of the data received from the gateway device 12, is passed to the data-link layer L2 and, at step S2 in FIG. 7, the frame version included in the data is identified by the identification control unit DC. At step S4 in FIG. 7, because the frame version value of the data output from the gateway device 22 is set to 0b01, the data from the physical layer L1 is passed by the identification control unit DC to the network layer L21 that forms the second upper layer L20 and, for example, transfer processing or the like is performed by path control of the network layer L21 (first step).

Next, let us consider the case of transmission process of data by the field device 11d (for example, transfer processing of received data). In this case, at step S10, data to be transmitted is passed from the network layer L11 that forms the first upper layer L10 or to the network layer L21 that forms the second upper layer L20 to the data-link layer L2. In the case of data passed from the network layer L11 that forms the first upper layer L10, processing to set the value of the frame version to 0b00 at step S11 and to pass the data to the physical layer L1 is performed by the identification control unit DC. In contrast, in the case of data passed from the network layer L21 that forms the second upper layer L20, processing to set the value of the frame version to 0b01 at step S12 and to pass the data to the physical layer L1 is performed by the identification control unit DC.

Data in which the frame version value is set to 0b00 is transmitted to a field device (or the gateway device 12) that is its destination, via the wireless network N11. In contrast, data in which the frame version value is set to 0b01 is transmitted to a field device (or the gateway device 22) that is its destination, via the wireless network N21. Operation similar to the above-described field device 11d is performed with regard to the field devices 11c, 21c, and 21d.

As noted above, in the first preferred embodiment of the present invention, in addition the physical layer L1 and data-link layer L2 that are common to the WirelessHART (registered trademark) and ISA100, the network layers L11 and L21 in both WirelessHART (registered trademark) and ISA100 are supported. Control is performed regarding which of the network layers L11 and L21 received data is to be passed, in accordance with the frame version included in received data.

By doing this, the creation of the routing tables for the wireless networks N11 and N21 and the transfer of data (packets) using these routing tables can be done, so that even if data (packets) are received that are not addressed to the local device, it is possible to perform proper path control via either the wireless network N11 or the wireless network N21, thereby enabling exchange of data between the communication systems CS1 and CS2. As a result, it is possible to use devices and tools used for the maintenance thereof in common between the communication systems CS1 and CS2, thereby enabling a reduction in cost, and an improvement in convenience, ease of maintenance, and expandability. Also, because of establishing redundancy in the communication paths, reliability is improved and communication range is extended.

Second Preferred Embodiment

Figure 9:
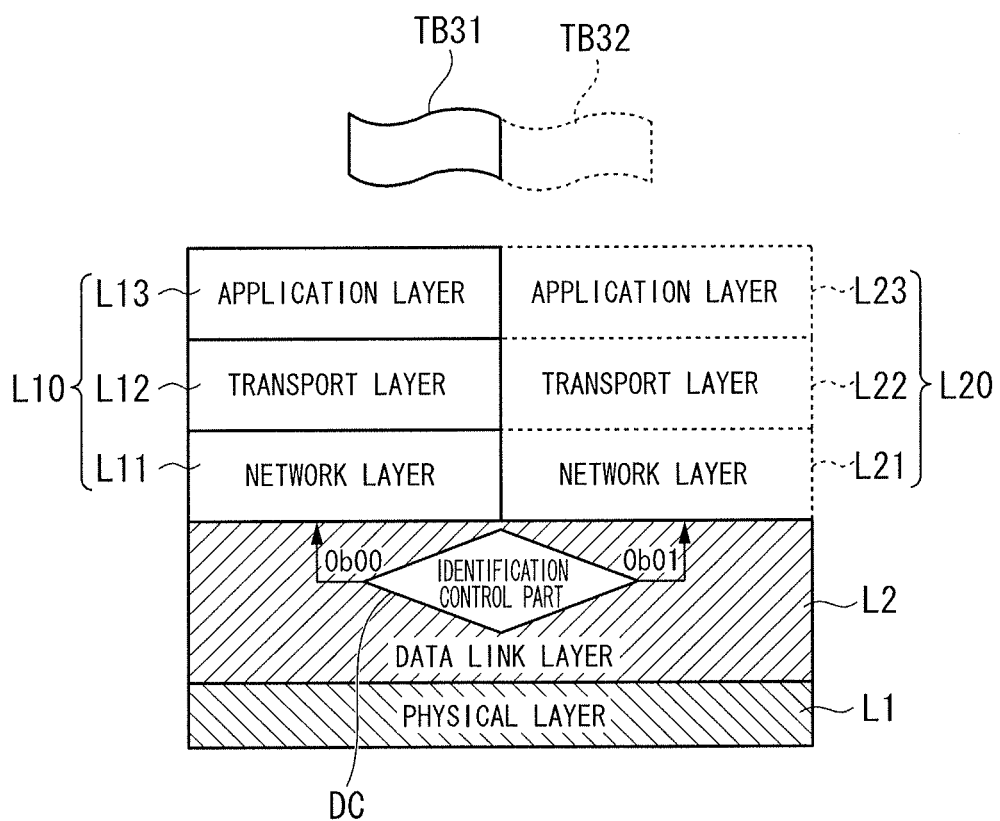
FIG. 9 is a block diagram illustrating a main part of a constitution of a communication device in accordance with a second preferred embodiment of the present invention.

FIG. 9 is a block diagram showing the main part of the constitution of a communication device in accordance with the second preferred embodiment of the present invention. The overall constitution of the communication system in accordance with the second preferred embodiment of the present invention is similar to that of the first preferred embodiment. As shown in FIG. 9, a field device as a communication device in accordance with the second preferred embodiment has the physical layer L1 and the data-link layer L2 illustrated in FIG. 5, the network layer L11 (first path control unit), the transport layer L12 (first transfer control unit), and the application layer L13 as the first upper layer L10, and the network layer L21 (second path control unit), the transport layer L22 (second transfer control unit), and the application layer L23 as the second upper layer L20.

That is, the field device of the second preferred embodiment of the present invention has all of the layers of the OSI reference model M1 (refer to FIG. 2) of WirelessHART (registered trademark), which is the wireless communication standard to which the communication system CS1 conforms, and all of the layers of the OSI reference model M2 (refer to FIG. 2) of ISA100, which is the wireless communication standard to which the communication system CS2 conforms. For this reason, in the field device of the second preferred embodiment of the present invention as well, in addition to a routing table TB31 of the wireless network N11 being created by the network layer L11, a routing table TB32 of the wireless network N21 is created by the network layer L21, and it is possible to perform data (packet) transfer using these routing tables.

The field device of the second preferred embodiment of the present invention also has a transport layer L12 that performs transfer control of data in the wireless network N11 in accordance with the path control performed by the network layer L11, and a transport layer L22 that performs transfer control of data in the wireless network N21 in accordance with the path control performed by the network layer L21. For this reason, not only is it possible to perform communication of data (packets) that straddle the wireless networks N11 and N21, but it is also possible to perform communication between the wireless networks N11 and N21. The field device of the second preferred embodiment of the present invention can also be used as a gateway, for example, to the wireless network N11 and the wireless network N21.

Figure 10A:
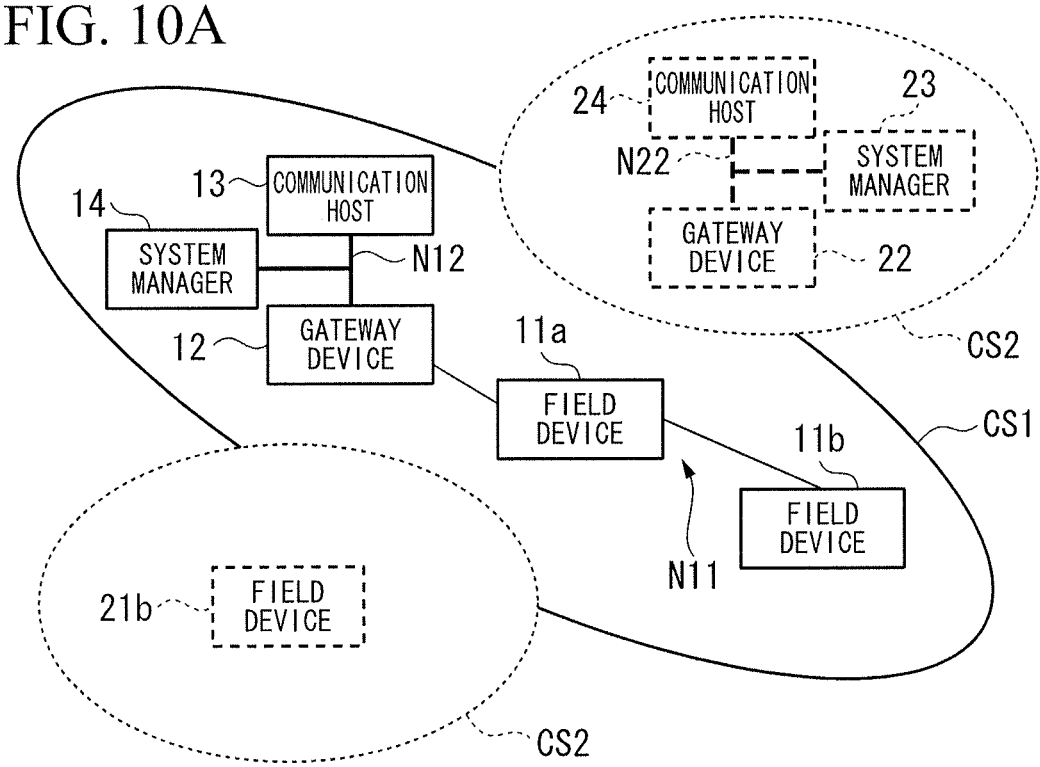
FIG. 10A is a diagram illustrating a specific effect of the preferred embodiments of the present invention.
Figure 10B:
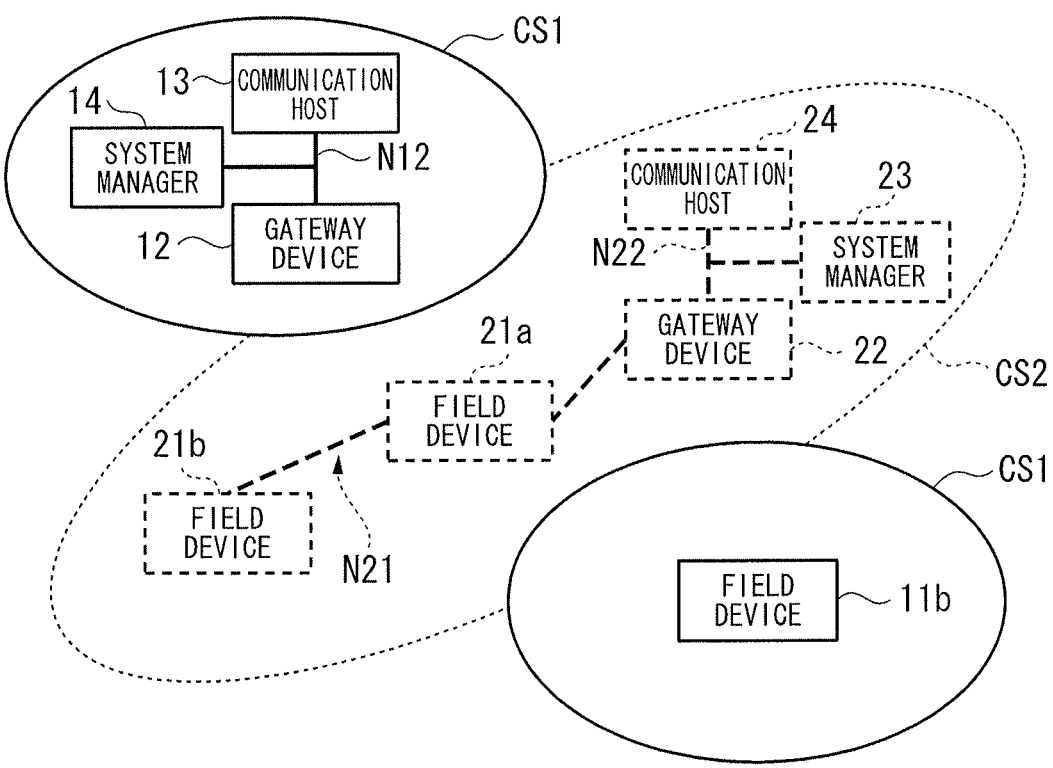
FIG. 10B is a diagram illustrating a specific effect of the preferred embodiments of the present invention.
Figure 11:
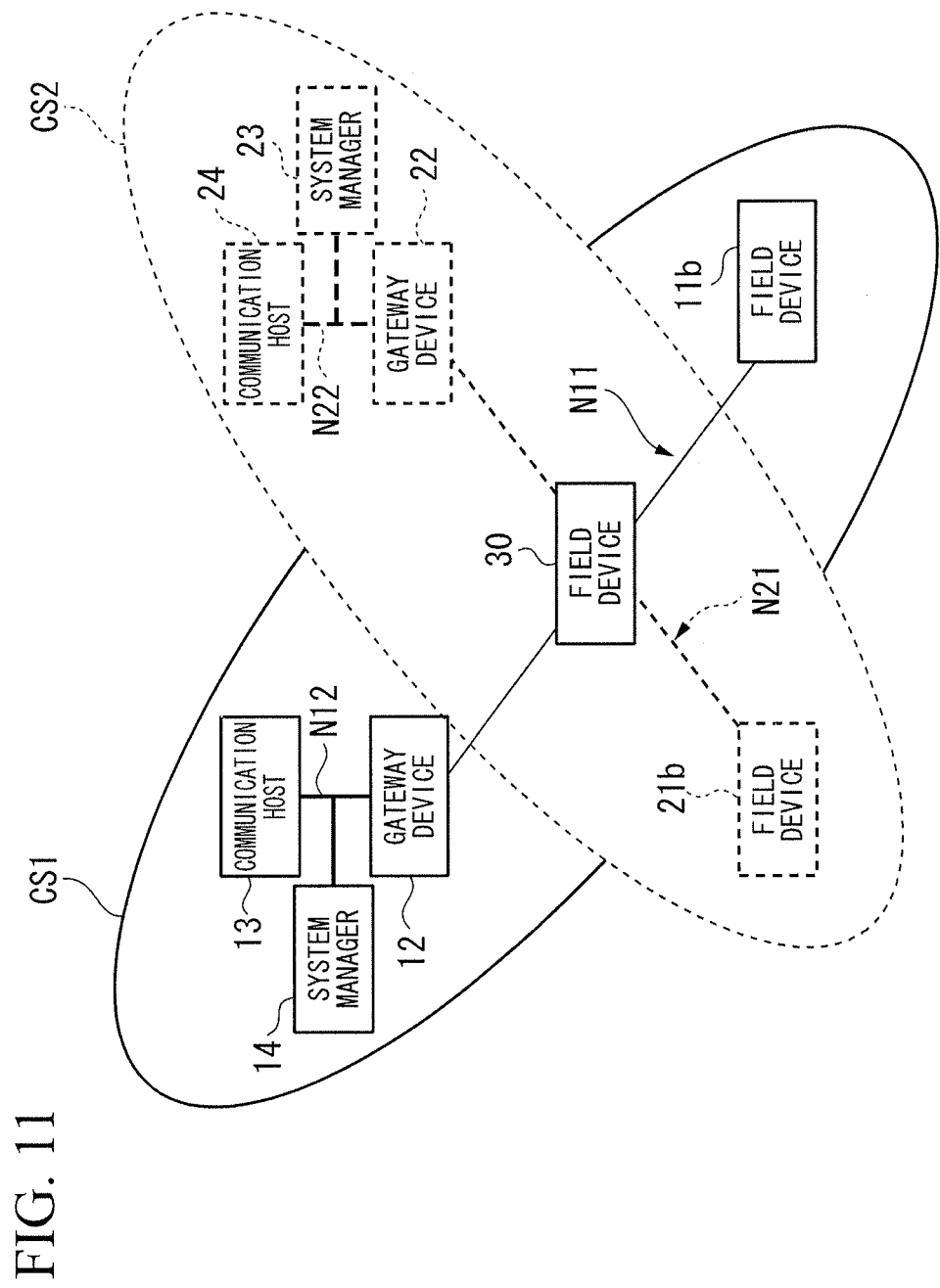
FIG. 11 is a diagram illustrating a specific effect of the preferred embodiments of the present invention.

The specific effect of the first and second preferred embodiment described above will be described. FIG. 10A, FIG. 10B, and FIG. 11 describe the specific effect of the preferred embodiments of the present invention. In FIG. 10A, FIG. 10B, and FIG. 11, the same reference symbols are assigned to elements that are the same as one shown in FIG. 1. First, as shown in FIG. 10A, in the communication system CS1, field devices 11a and 11b and the gateway device 12 are disposed in proximity to one another, and in communication system CS2 the field device 21b is disposed at a distance from the gateway device 22. In the case of this arrangement, although in the communication system CS1 wireless communication is possible via the wireless network N11, in the communication system CS2 wireless communication is not possible via the wireless network N21.

Next, consider, as shown in FIG. 10B, the case in which, in the communication system CS1, the field device 11b is disposed at a distance from the gateway device 12, and in the communication system CS2 the field devices 21a and 21b and the gateway device 22 are disposed in proximity to one another. In the case of this arrangement, although in the communication system CS1 wireless communication is not possible via the wireless network N11, in the communication system CS2 wireless communication is possible via the wireless network N21.

If the arrangement shown in FIG. 10A is made, if a field device 30 that is a dual-stack field device (for example, the field device 11c, 11d, 21c, or 21d shown in FIG. 1) is installed in place of the field device 11a of the communication system CS1, it is possible to adopt a constitution such as shown in FIG. 11. Also, if the arrangement shown in FIG. 10B is made, if a field device 30 that is a dual-stack field device is installed in place of the field device 21a of the communication system CS2, it is also possible to adopt the constitution such as shown in FIG. 11.

As shown in FIG. 11, because wireless communication is possible via the wireless networks N11 and N12, the field device 30 functions as a so-called repeater between the field device 11b forming the communication system CS1 and the gateway device 12, and between the field device 21b forming the communication system CS2 and the gateway device 22. For this reason, even if either, as shown in FIG. 10A, the field device 21b and the gateway device 22 are disposed at a distance from one another or, as shown in FIG. 10B, the field device 11b and the gateway device 12 are disposed at a distance from one another, wireless communication is possible via the wireless networks N11 and N12.

Although the foregoing has been a description of a communication device, a communication system, and a communication method using preferred embodiments of the present invention, the present invention is not restricted to the above-described preferred embodiments, and can be freely changed within the scope of the present invention. For example, in the above-noted preferred embodiments, examples are given in which the communication system CS1 is a communication system performing wireless communication conforming the WirelessHART (registered trademark), and the communication system CS2 is a communication system performing wireless communication conformation to ISA100. However, the present invention can be applied to communication devices and communication systems that conform to a plurality of wireless communication standards having the physical layer and the data-link layer of the OSI reference model in common.

Also, in the above-noted preferred embodiments, examples have been described in which the gateway device 12, the system manager 13, and the communication host 14 that form the communication system CS1 and the gateway device 22, the system manager 23, and the communication host 24 that form the communication system CS2 are each implemented as separate devices. However, of these, two arbitrary devices can be expressed as one device. Additionally, although the above-noted preferred embodiments have been described by examples in which the communication device is a field device, the communication device of the present invention is not restricted to being a field device.

INDUSTRIAL APPLICABILITY

According to the present invention, wireless communication is possible between different communication systems, cost is reduced, convenience and ease of maintenance are improved, and expandability is enhanced.

DESCRIPTION OF THE REFERENCE SYMBOLS 11c, 11d field device
21c, 21d field device
30 field device
CS communication system
DC identification control unit
L1 physical layer
L2 data-link layer
L11, L21 network layer
L12, L22 transport layer
N11, N21 wireless network

The invention claimed is:

1. A communication device in which the OSI reference model physical layer and data-link layer perform wireless communication via at least one of a first wireless network conforming to a first wireless communication standard and a second wireless network conforming to a second wireless communication standard,
the communication device comprising:
a first path controller that s provided in a network layer of the OSI reference model, creates a first routing table of the first wireless network, and performs first path control in the first wireless network by using the first routing table;
a second path controller that is provided in a network layer of the OSI reference model, creates a second routing table of the second wireless network, and performs second path control in the second wireless network by using the second routing table; and
an identification controller, provided in the data-link layer, that identifies that data, which is received in the physical layer, based on the identification information included in the data, is to be transmitted via either the first wireless network or the second wireless network, the identification controller controlling so as to transmit, based on the identification result, the data via the first wireless network or the second wireless network.

2. The communication device according to claim 1, wherein,
if the data is received via the first wireless network, the identification controller appends to the data a first identification information to the effect that the data is to be transmitted via the first wireless network, and
if the data is received via the second wireless network, the identification controller appends to the data a second identification information to the effect that the data is to be transmitted via the second wireless network.

3. The communication device according to claim 1, wherein
if identification is made that the data is to be transmitted via the first wireless network, the identification controller passes the data to the first path controller, and
if identification is made that the data is to be transmitted via the second wireless network, the identification controller passes the data to the second path controller.

4. The communication device according to claim 3, further comprising:
a first transfer controller that performs first transfer control of the data in the first wireless network in accordance with the first path control performed by the first path controller; and
a second transfer controller that performs second transfer control of the data in the second wireless network in accordance with the second path control performed by the second path controller.

5. The communication device according to claim 4, wherein
the first transfer controller and the second transfer controller are provided in a transport layer of the OSI reference model.

6. The communication device according to claim 1, wherein one of the first wireless communication standard and the second wireless communication standard is ISA100, and the other is WirelessHART.

7. The communication device according to claim 1, wherein the identification information is a value of frame version included in an MHR (MAC Header) of the data.

8. A communication system comprising a plurality of communication devices wherein the OSI reference model physical layer and data-link layer perform wireless communication via at least one of a first wireless network conforming to a first wireless communication standard and a second wireless network conforming to a second wireless communication standard,
wherein at least one of the communication devices comprises:
a first path controller that is provided in a network layer of the OSI reference model, creates a first routing table of the first wireless network, and performs first path control in the first wireless network by using the first routing table;
a second path controller that is provided in a network layer of the OSI reference model, creates a second routing table of the second wireless network, and performs second path control in the second wireless network by using the second routing table; and
an identification controller, provided in the data-link layer, that identifies that data, which is received in the physical layer, based on the identification information included in the data, is to be transmitted via either the first wireless network or the second wireless network, the identification controller controlling so as to transmit, based on the identification result, the data via the first wireless network or the second wireless network.

9. The communication system according to claim 8, wherein,
if the data is received via the first wireless network, the identification controller appends to the data a first identification information to the effect that the data is to be transmitted via the first wireless network, and if the data is received via the second wireless network, the identification controller appends to the data a second identification information to the effect that the data is to be transmitted via the second wireless network.

10. The communication system according to claim 8, wherein
if identification is made that the data is to be transmitted via the first wireless network, the identification controller passes the data to the first path controller, and
if identification is made that the data is to be transmitted via the second wireless network, the identification controller passes the data to the second path controller.

11. The communication system according to claim 10, wherein at least one of the communication devices further comprises:
a first transfer controller that performs first transfer control of the data in the first wireless network in accordance with the first path control performed by the first path controller; and
a second transfer controller that performs second transfer control of the data in the second wireless network in accordance with the second path control performed by the second path controller.

12. The communication system according to claim 11, wherein
the first transfer controller and the second transfer controller are provided in a transport layer of the OSI reference model.

13. The communication system according to claim 8, wherein one of the first wireless communication standard and the second wireless communication standard is ISA100, and the other is WirelessHART.

14. The communication system according to claim 8, wherein the identification information is a value of frame version included in an MHR (MAC Header) of the data.

15. A communication method wherein the OSI reference model physical layer and data-link layer perform wireless communication via at least one of a first wireless network conforming to a first wireless communication standard and a second wireless network conforming to a second wireless communication standard,
the communication method comprising:
creating a first routing table of the first wireless network by a first path controller that is provided in a network layer of the OSI reference model, and performing first path control in the first wireless network by using the first routing table;
creating a second routing table of the second wireless network by a second path controller that is provided in a network layer of the OSI reference model, and performing second path control in the second wireless network by using the second routing table; and
identifying that data received in the physical layer, based on the identification information included in the data, is to be transmitted via either the first wireless network or the second wireless network; and
transmitting, based on the identification result, the data via the first wireless network or the second wireless network.

16. The communication method according to claim 15, further comprising:
receiving data via at least one of the first wireless network and the second wireless network;
appending to the data a first identification information to the effect that the data is to be transmitted via the first wireless network if the data is received via the first wireless network; and
appending to the data a second identification information to the effect that the data is to be transmitted via the second wireless network if the data is received via the second wireless network.

17. The communication method according to claim 15, wherein one of the first wireless communication standard and the second wireless communication standard is ISA100, and the other is WirelessHART.

18. The communication method according to claim 15, wherein the identification information is a value of frame version included in an MHR (MAC Header) of the data.

19. A method for identifying data in a communication device wherein the OSI reference model physical layer and data-link layer perform wireless communication via at least one of a first wireless network conforming to a first wireless communication standard and a second wireless network conforming to a second wireless communication standard,
the method for identifying data comprising:
creating a first routing table of the first wireless network by a first path controller that is provided in a network layer of the OS reference model, and performing first path control in the first wireless network by using the first routing table;
creating a second routing table of the second wireless network by a second path controller that is provided in a network layer of the OSI reference model, and performing second path control in the second wireless network by using the second routing table; and
identifying a value of frame version included in an MHR (MAC Header) of data received in the physical layer;
transmitting the data via the first wireless network, as a result of the identification, if the value of the frame version is a first value; and
transmitting the data via the second wireless network, as a result of the identification, if the value of the frame version is a second value.

20. The method for identifying data according to claim 19, wherein one of the first wireless communication standard and the second wireless communication standard is ISA100, and the other is WirelessHART.

* * * * *